(12) United States Patent
Hamada (10) Patent No.: US 12,386,363 B2
(45) Date of Patent: *Aug. 12, 2025

(54) SYSTEM FOR AND METHOD OF CONTROLLING BEHAVIOR OF WATERCRAFT

(71) Applicant: YAMAHA HATSUDOKI KABUSHIKI KAISHA, Iwata (JP)

(72) Inventor: Satoru Hamada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 562 days.

This patent is subject to a terminal disclaimer.

(21) Appl. No.: 17/885,594

(22) Filed: Aug. 11, 2022

(65) Prior Publication Data

US 2023/0075914 A1  Mar. 9, 2023

(30) Foreign Application Priority Data

Sep. 6, 2021 (JP) .................. 2021-144772

(51) Int. Cl.
| | |
|---|---|
| *B63H 20/10* | (2006.01) |
| *B63B 79/10* | (2020.01) |
| *B63B 79/40* | (2020.01) |
| *B63H 20/02* | (2006.01) |
| *G05D 1/00* | (2006.01) |

(52) U.S. Cl.
CPC .......... *G05D 1/0875* (2013.01); *B63B 79/10* (2020.01); *B63B 79/40* (2020.01); *B63H 20/02* (2013.01); *B63H 20/10* (2013.01)

(58) Field of Classification Search
CPC ...... G05D 1/0875; B63B 79/10; B63B 79/40; B63H 20/02; B63H 20/08; B63H 20/10; Y02T 70/10

See application file for complete search history.

(56) References Cited

U.S. PATENT DOCUMENTS

| | | | | |
|---|---|---|---|---|
| 5,366,393 A | * | 11/1994 | Uenage ................. | B63H 20/10 440/61 G |
| 2007/0093149 A1 | * | 4/2007 | Csoke .................... | B63H 20/10 440/61 G |
| 2019/0185124 A1 | * | 6/2019 | Tokuda .................. | B63H 20/02 |
| 2021/0188406 A1 | | 6/2021 | Nakatani | |
| 2021/0291943 A1 | * | 9/2021 | Inoue ..................... | B63B 39/061 |

FOREIGN PATENT DOCUMENTS

JP          2021-095072 A     6/2021

* cited by examiner

*Primary Examiner* — Anthony D Wiest
(74) *Attorney, Agent, or Firm* — Keating & Bennett, LLP (57) ABSTRACT

A system includes an outboard motor, an actuator, a pitch angle sensor, a trim angle sensor, and a controller to obtain at least either of a pitch angle of a watercraft and an angular velocity of the pitch angle, and to obtain a trim angle of the outboard motor. The controller is configured or programmed to selectively set either a trim-up direction or a trim-down direction as a trim direction based on the trim angle of the outboard motor and at least either of the pitch angle of the watercraft and the angular velocity of the pitch angle. The controller is configured or programmed to control the actuator to cause the outboard motor to perform a trim motion in the trim direction.

9 Claims, 7 Drawing Sheets

SYSTEM FOR AND METHOD OF CONTROLLING BEHAVIOR OF WATERCRAFT

CROSS REFERENCE TO RELATED APPLICATIONS

This application claims the benefit of priority to Japanese Patent Application No. 2021-144772 filed on Sep. 6, 2021. The entire contents of this application are hereby incorporated herein by reference.

BACKGROUND OF THE INVNETION

1. Field of the Invention

The present invention relates to a system for and a method of controlling a behavior of a watercraft.

2. Description of the Related Art

Chances are that pitching movement called "porpoising" occurs during high-speed navigation of a watercraft with installation of a marine propulsion device such as an outboard motor. A main reason for the occurrence of porpoising is as follows.

In high-speed navigation of the watercraft, the bow of the watercraft is elevated by lift. When the bow of the watercraft is elevated, the center of lift is shifted rearward such that a moment acts on the watercraft to lower the bow. Accordingly, the bow of the watercraft is lowered. When the bow of the watercraft is lowered, the center of lift is shifted forward such that a moment acts on the watercraft to elevate the bow. Accordingly, the bow of the watercraft is elevated. Repetition of the motions described herein results in the occurrence of porpoising of the watercraft, that is, repetition of elevation and lowering of the bow.

A reduction in the rotational speed of an engine has been known as a technology for alleviating porpoising. Alternatively, as described in Japan Patent Application Publication No. 2021-95072, controlling the posture of a watercraft by lowering a trim tab has been known as a technology for alleviating porpoising. Both of the technologies for alleviating porpoising described above inevitably cause a reduction in the velocity of the watercraft.

SUMMARY OF THE INVENTION

Preferred embodiments of the present invention each inhibit a reduction in velocity of watercrafts, and simultaneously alleviate porpoising.

A system according to a preferred embodiment of the present invention controls a behavior of a watercraft. The system includes an outboard motor, an actuator, a pitch angle sensor, a trim angle sensor, and a controller. The outboard motor includes a trim shaft. The outboard motor is attachable to the watercraft so as to be pivotable about the trim shaft. The actuator causes the outboard motor to perform a trim motion in a trim-up direction and a trim-down direction by causing the outboard motor to pivot about the trim shaft. The pitch angle sensor detects at least either of a pitch angle of the watercraft and an angular velocity of the pitch angle. The trim angle sensor detects a trim angle of the outboard motor. The controller is communicably connected to the actuator. The controller is configured or programmed to obtain at least either of the pitch angle of the watercraft and the angular velocity of the pitch angle. The controller is configured or programmed to obtain the trim angle of the outboard motor. The controller is configured or programmed to selectively set either the trim-up direction or the trim-down direction as a trim direction based on the trim angle of the outboard motor and at least either of the pitch angle of the watercraft and the angular velocity of the pitch angle. The controller is configured or programmed to control the actuator to cause the outboard motor to perform the trim motion in the trim direction.

A method according to another preferred embodiment of the present invention relates to a method of controlling a behavior of a watercraft. The watercraft includes an outboard motor and an actuator. The outboard motor is pivotable about a trim shaft. The actuator causes the outboard motor to perform a trim motion in a trim-up direction and a trim-down direction by causing the outboard motor to pivot about the trim shaft. The method includes obtaining at least either of a pitch angle of the watercraft and an angular velocity of the pitch angle, obtaining a trim angle of the outboard motor, selectively setting either the trim-up direction or the trim-down direction as a trim direction based on the trim angle of the outboard motor and at least either of the pitch angle of the watercraft and the angular velocity of the pitch angle, and controlling the actuator to cause the outboard motor to perform the trim motion in the trim direction.

A system according to yet another preferred embodiment of the present invention controls a behavior of a watercraft. The system includes a marine propulsion device, an actuator, a pitch angle sensor, a trim angle sensor, and a controller. The marine propulsion device includes a trim shaft. The marine propulsion device is attachable to the watercraft so as to be pivotable about the trim shaft. The actuator causes the marine propulsion device to perform a trim motion in a trim-up direction and a trim-down direction by causing the marine propulsion device to pivot about the trim shaft. The pitch angle sensor detects at least either of a pitch angle of the watercraft and an angular velocity of the pitch angle. The trim angle sensor detects a trim angle of the marine propulsion device. The controller is connected to the actuator in a communicable manner. The controller is configured or programmed to obtain the at least either of the pitch angle of the watercraft and the angular velocity of the pitch angle. The controller is configured or programmed to obtain the trim angle of the marine propulsion device. The controller is configured or programmed to selectively set either the trim-up direction or the trim-down direction as a trim direction based on the trim angle of the marine propulsion device and at least either of the pitch angle of the watercraft and the angular velocity of the pitch angle. The controller is configured or programmed to control the actuator to cause the marine propulsion device to perform the trim motion in the trim direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
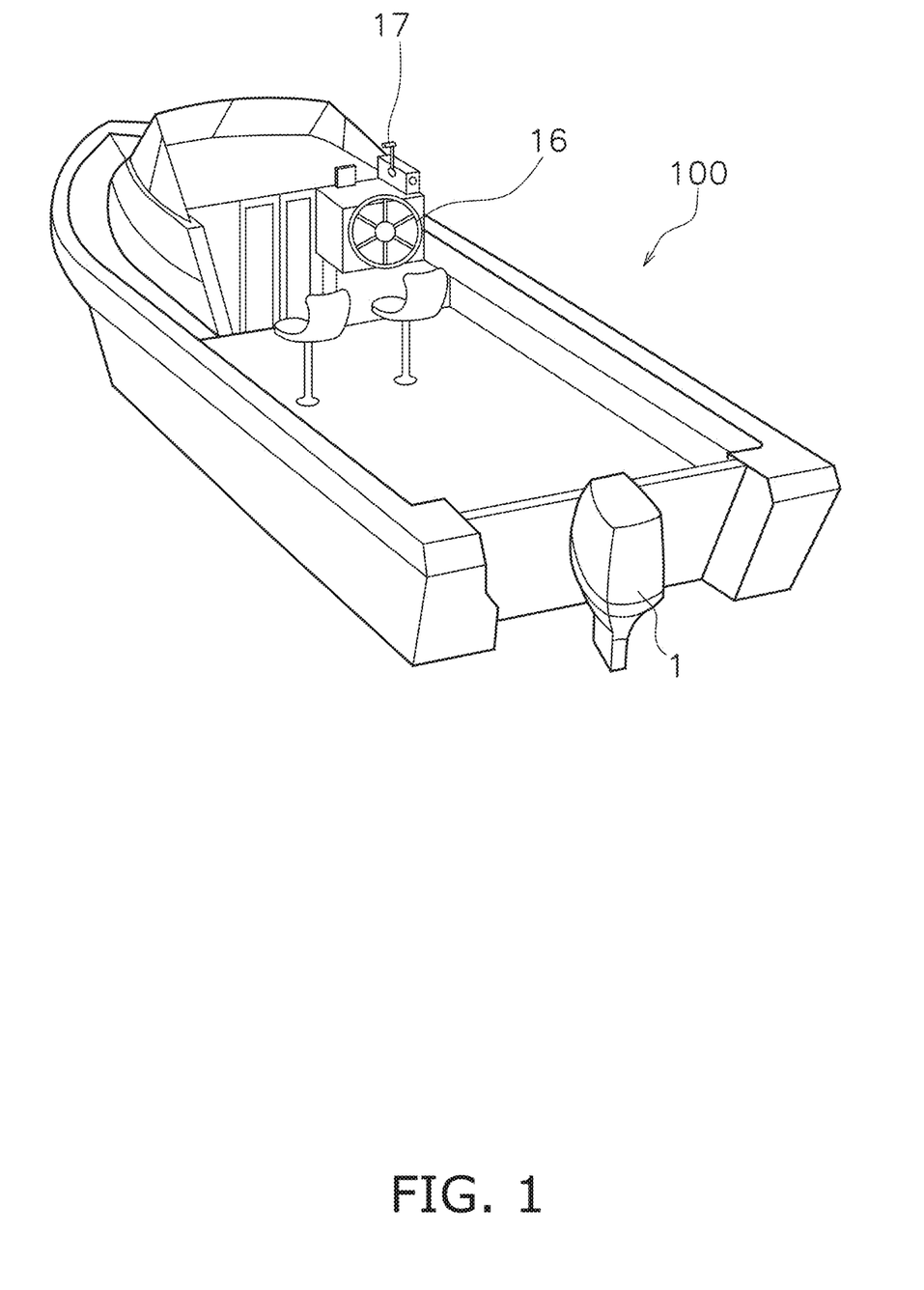
FIG. 1 is a perspective view of a watercraft according to a preferred embodiment of the present invention.
Figure 2:
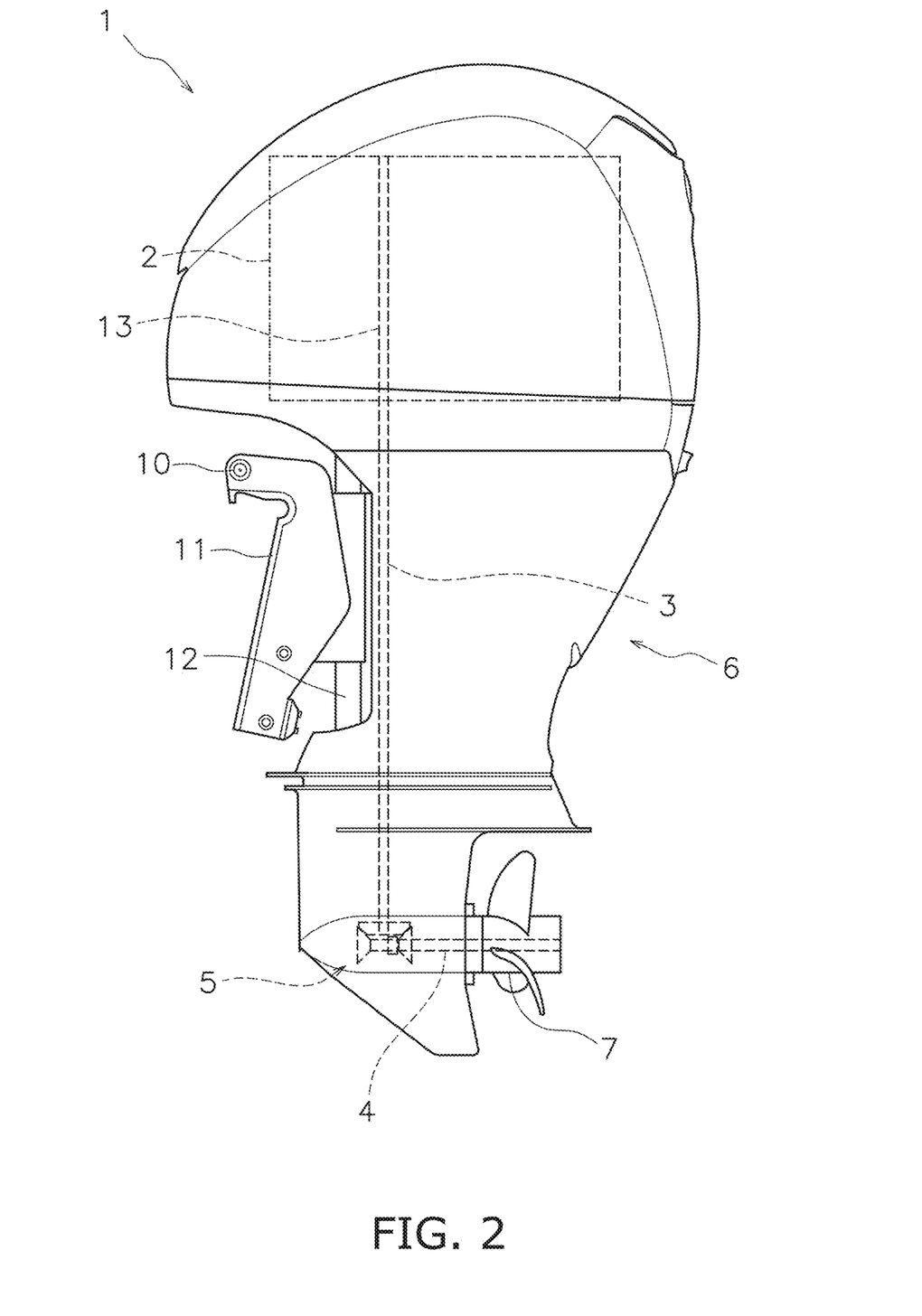
FIG. 2 is a side view of an outboard motor.

Preferred embodiments of the present invention will be explained with reference to drawings. FIG. 1 is a perspective view of a watercraft 100 according to a preferred embodiment of the present invention. The watercraft 100 is provided with an outboard motor 1 attached to the stern thereof. The outboard motor 1 generates a thrust to propel the watercraft 100. FIG. 2 is a side view of the outboard motor 1. The outboard motor 1 is attached to the watercraft 100 by a bracket 11. The bracket 11 supports the outboard motor 1 such that the outboard motor 1 is rotatable about a trim shaft 10. The trim shaft 10 extends in a right-and-left direction of the outboard motor 1. The bracket 11 supports the outboard motor 1 such that the outboard motor 1 is rotatable about a steering shaft 12. The steering shaft 12 extends in an up-and-down direction of the outboard motor 1.

The outboard motor 1 includes a drive unit 2, a drive shaft 3, a propeller shaft 4, a shift mechanism 5, and a housing 6. The drive unit 2 generates the thrust to propel the watercraft 100. The drive unit 2 is, for instance, an internal combustion engine. The drive unit 2 includes a crankshaft 13. The crankshaft 13 extends in the up-and-down direction of the outboard motor 1.

The drive shaft 3 is connected to the crankshaft 13. The drive shaft 3 extends in the up-and-down direction of the outboard motor 1. The propeller shaft 4 extends in a back-and-forth direction of the outboard motor 1. The propeller shaft 4 is connected to the drive shaft 3 through the shift mechanism 5. A propeller 7 is attached to the propeller shaft 4. The shift mechanism 5 includes gears and a clutch to switch between forward movement and rearward movement. The shift mechanism 5 switches the direction of rotation transmitted from the drive shaft 3 to the propeller shaft 4. The housing 6 accommodates the drive unit 2, the drive shaft 3, the propeller shaft 4, and the shift mechanism 5.

Figure 3:
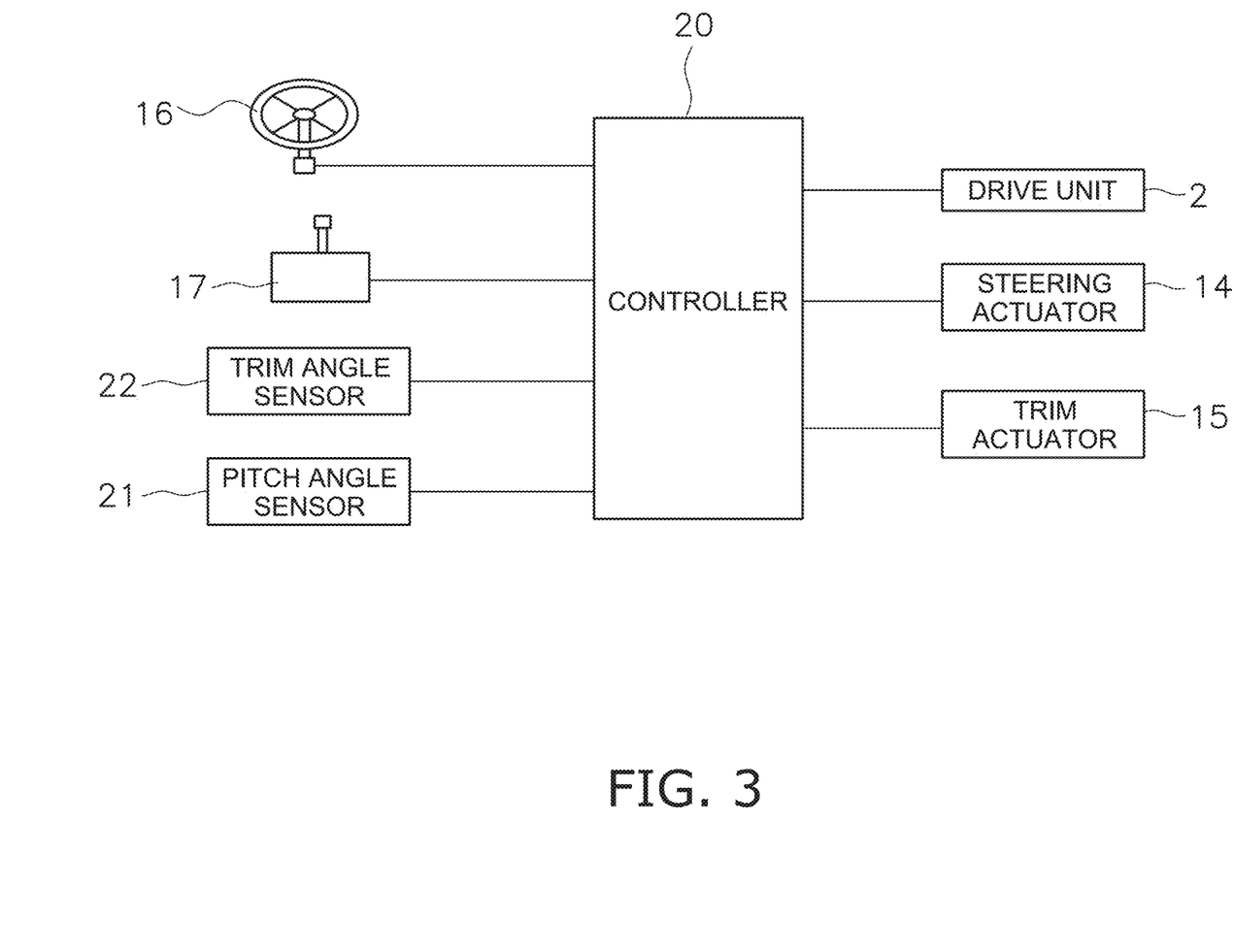
FIG. 3 is a schematic diagram for showing a configuration of a control system for the watercraft.

FIG. 3 is a schematic diagram for showing a configuration of a control system for the watercraft 100. As shown in FIG. 3, the outboard motor 1 includes a steering actuator 14 and a trim actuator 15. The steering actuator 14 rotates the outboard motor 1 about the steering shaft 12. The steering actuator 14 is, for instance, an electric motor. However, the steering actuator 14 may be another type of actuator such as an electric cylinder, a hydraulic motor, or a hydraulic cylinder.

The trim actuator 15 rotates the outboard motor 1 about the trim shaft 10. The trim actuator 15 is, for instance, an electric motor. However, the trim actuator 15 may be another type of actuator such as an electric cylinder, a hydraulic motor, or a hydraulic cylinder. The trim actuator 15 rotates the outboard motor 1 about the trim shaft 10 such that the outboard motor 1 is caused to perform a trim motion in a trim-up direction and a trim-down direction.

The control system includes a steering member 16 and a throttle operating member 17. The steering member 16 and the throttle operating member 17 are provided in a cockpit of the watercraft 100. The steering member 16 is operable by an operator to manipulate a turning direction of the watercraft 100. The steering member 16 includes, for instance, a steering wheel. However, the steering member 16 may include another member such as a joystick.

The throttle operating member 17 includes, for instance, a throttle lever. The throttle operating member 17 is operable by the operator to regulate the magnitude of the thrust generated by the outboard motor 1. The throttle operating member 17 is also operable by the operator to switch the direction of the thrust generated by the outboard motor 1 between forward and rearward directions.

The control system includes a controller 20. The controller 20 includes a processor such as a CPU and memories such as a RAM and a ROM. The controller 20 stores programs and data to control the outboard motor 1. The controller 20 may include a plurality of controllers provided as discrete components.

The controller 20 is connected to the drive unit 2, the steering actuator 14, and the trim actuator 15 in a communicable manner. The controller 20 controls the drive unit 2 in accordance with the operation of the throttle operating member 17. The output rotational speed of the drive unit 2 is thus controlled. The controller 20 controls the steering actuator 14 in accordance with the operation of the steering member 16. The rudder angle of the outboard motor 1 is thus controlled.

The control system includes a pitch angle sensor 21 and a trim angle sensor 22. The pitch angle sensor 21 detects a pitch angle of the watercraft 100 and an angular velocity of the pitch angle (hereinafter referred to as "pitch angular velocity"). The pitch angle indicates a tilt angle in the up-and-down direction of the watercraft 100 relative to a horizontal direction. The pitch angle of the watercraft 100 and the pitch angular velocity thereof are exemplified as motion information indicating up-and-down directional motions of the bow of the watercraft 100.

The pitch angle sensor 21 includes, for instance, an IMU (Inertial Measurement Unit). The pitch angle sensor 21 outputs a pitch angle signal indicating the pitch angle of the watercraft 100 and the pitch angular velocity thereof. The trim angle sensor 22 detects a trim angle of the outboard motor 1. The trim angle indicates a rotational angle of the outboard motor 1 about the trim shaft 10 from a predetermined reference direction (e.g., vertical direction). The trim angle sensor 22 outputs a trim angle signal indicating the trim angle of the outboard motor 1.

Figure 4:
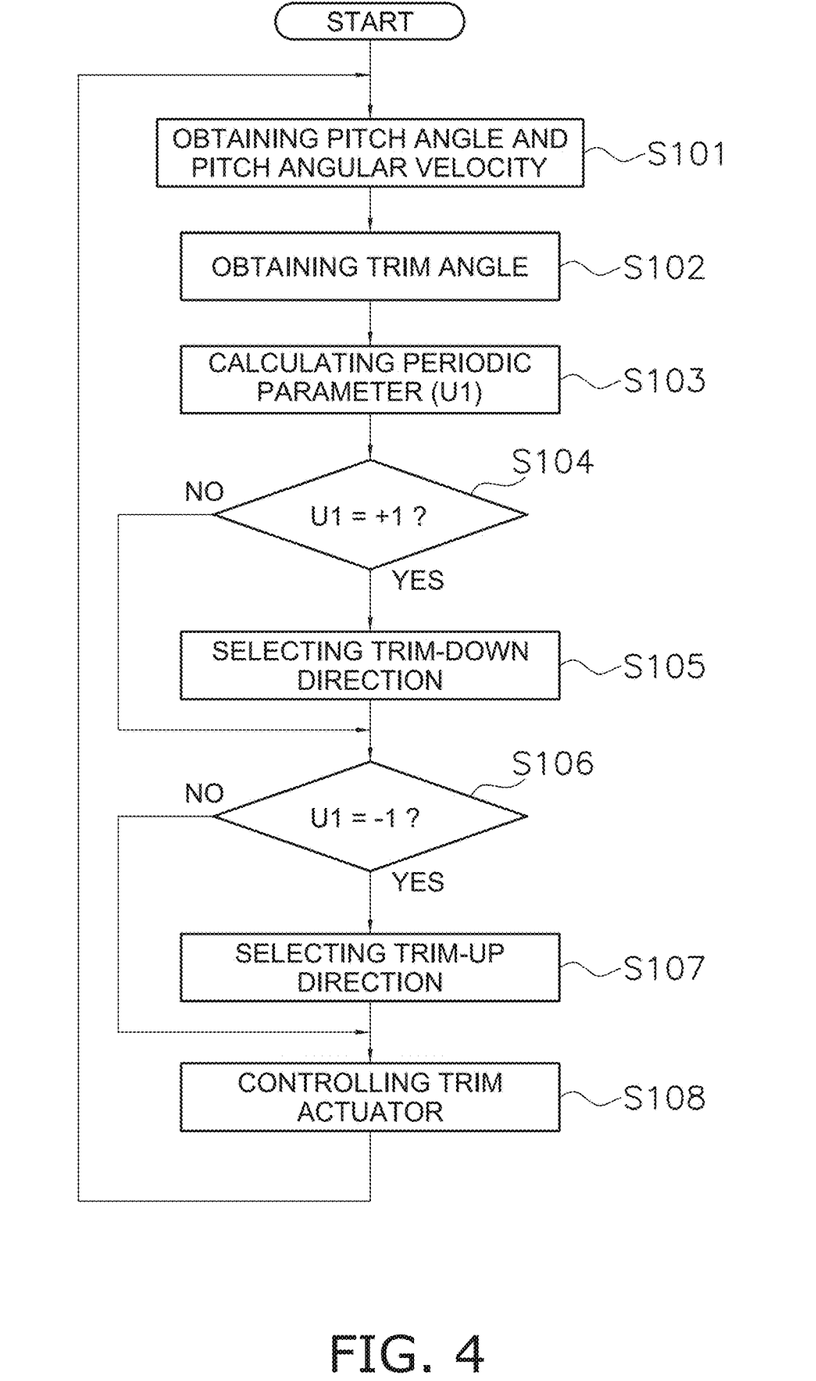
FIG. 4 is a flowchart for showing a series of processes of porpoising inhibiting control.

The controller 20 controls the trim motion based on the pitch angle of the watercraft 100, the pitch angular velocity thereof, and the trim angle of the outboard motor 1 to execute a porpoising inhibiting control to inhibit porpoising. The porpoising inhibiting control will be hereinafter explained. FIG. 4 is a flowchart showing a series of processes of the porpoising inhibiting control.

As shown in FIG. 4, in step S101, the controller 20 obtains a pitch angle and a pitch angular velocity thereof. The controller 20 receives a pitch angle signal and obtains the pitch angle and the pitch angular velocity thereof from the pitch angle signal.

In step S102, the controller 20 obtains a trim angle. The controller 20 receives a trim angle signal and obtains the trim angle from the trim angle signal. In step S103, the controller 20 calculates a periodic parameter. The periodic parameter is a parameter calculated based on the pitch angle of the watercraft 100, the pitch angular velocity thereof, and the trim angle of the outboard motor 1. The value of the periodic parameter periodically varies with a variation in the pitch angle of the watercraft 100 and the pitch angular velocity thereof during the occurrence of porpoising of the watercraft 100. The periodic parameter is expressed by the following formula (1).

$$U1 = a1 \times (\theta p - \theta p^*) + a2 \times d\theta p + a3 \times (\theta t - \theta t^*) \quad (1)$$

"U1" indicates the periodic parameter. "θp" indicates the pitch angle of the watercraft 100. "dθp" indicates the pitch angular velocity of the watercraft 100. "θt" indicates the trim angle of the outboard motor 1. "a1", "a2", and "a3" indicate predetermined coefficients that are set depending on the type and the state of the watercraft 100 and those of the outboard motor 1. "θp*" indicates an equilibrium pitch angle of the watercraft 100 during navigation. "θt*" indicates a target trim angle of the watercraft 100 during navigation. The periodic parameter periodically varies between −1 and +1 during the occurrence of porpoising of the watercraft 100.

In step S104, the controller 20 determines whether or not the periodic parameter is +1. When determining that the periodic parameter is +1, the controller 20 sets the trim-down direction as the trim direction in step S105.

In step S106, the controller 20 determines whether or not the periodic parameter is −1. When it is determined that the periodic parameter is −1, the controller 20 sets the trim-up direction as the trim direction in step S107.

In step S108, the controller 20 controls the trim actuator 15 to cause the outboard motor 1 to perform the trim motion in the trim direction. In other words, the controller 20 causes the outboard motor 1 to perform the trim motion in the trim-down direction when the periodic parameter becomes +1. Conversely, the controller 20 causes the outboard motor 1 to perform the trim motion in the trim-up direction when the periodic parameter becomes −1. The controller 20 repeatedly executes the processes in steps S101 to S108.

Figure 5:
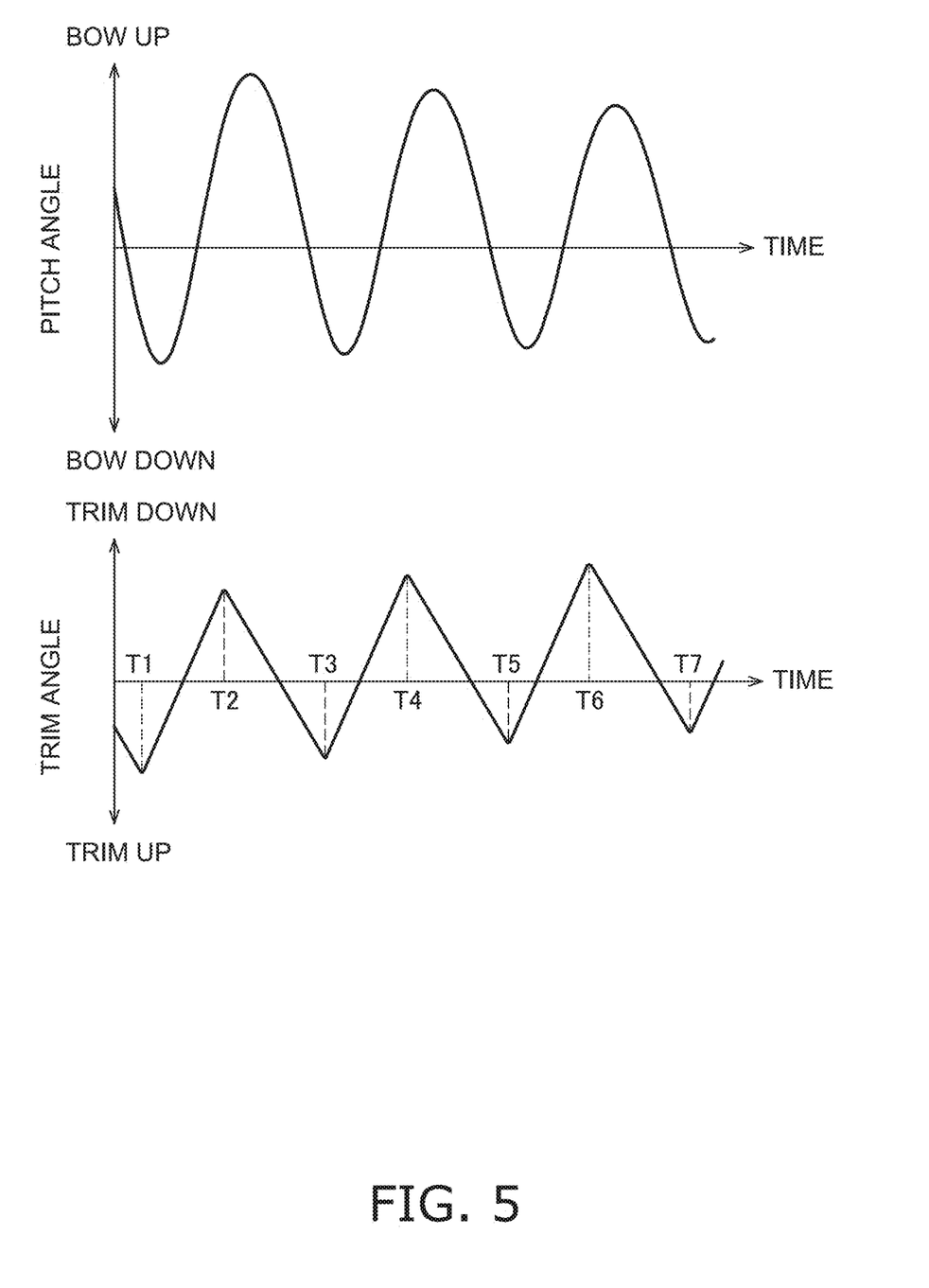
FIG. 5 includes a chart for showing a variation in a pitch angle of the watercraft during the occurrence of porpoising and a chart for showing a variation in a trim angle caused by the porpoising inhibiting control.

FIG. 5 includes charts for showing a variation in a trim angle caused by the porpoising inhibiting control with respect to a variation in a pitch angle of the watercraft 100 during the occurrence of porpoising. As shown in FIG. 5, during the occurrence of porpoising, the pitch angle of the watercraft 100 varies periodically. At time T1, the controller 20 determines that the periodic parameter becomes +1. Based on this, the controller 20 causes the outboard motor 1 to perform the trim motion in the trim-down direction. The controller 20 causes the outboard motor 1 to perform the trim motion in the trim-down direction from time T1 to time T2.

At time T2, the controller 20 determines that the periodic parameter becomes −1. Based on this, the controller 20 causes the outboard motor 1 to perform the trim motion in the trim-up direction. The controller 20 causes the outboard motor 1 to perform the trim motion in the trim-up direction from time T2 to time T3.

Likewise, subsequently, the controller 20 causes the outboard motor 1 to perform the trim motion in the trim-down direction from time T3 to time T4. The controller 20 causes the outboard motor 1 to perform the trim motion in the trim-up direction from time T4 to time T5. The controller 20 causes the outboard motor 1 to perform the trim motion in the trim-down direction from time T5 to time T6. The controller 20 causes the outboard motor 1 to perform the trim motion in the trim-up direction from time T6 to time T7.

It should be noted that the controller 20 may execute the porpoising inhibiting control described above when a predetermined start condition is satisfied. The start condition indicates the occurrence of porpoising of the watercraft 100. For example, the start condition may include a periodic variation in the pitch angle at about 0.1 Hz or greater.

In the control system for the outboard motor 1 according to a preferred embodiment of the present invention, either the trim-up direction or the trim-down direction is selectively set as the trim direction based on the pitch angle of the watercraft 100, the pitch angular velocity thereof, and the trim angle of the outboard motor 1. Because of this, the trim direction is able to be set by accurately determining the behavior of the watercraft 100 during the occurrence of porpoising. Then, the outboard motor 1 is caused to perform the trim motion in the set trim direction such that porpoising is alleviated. Consequently, a reduction in the velocity of the watercraft 100 is inhibited, and simultaneously porpoising is alleviated.

Figure 6A:
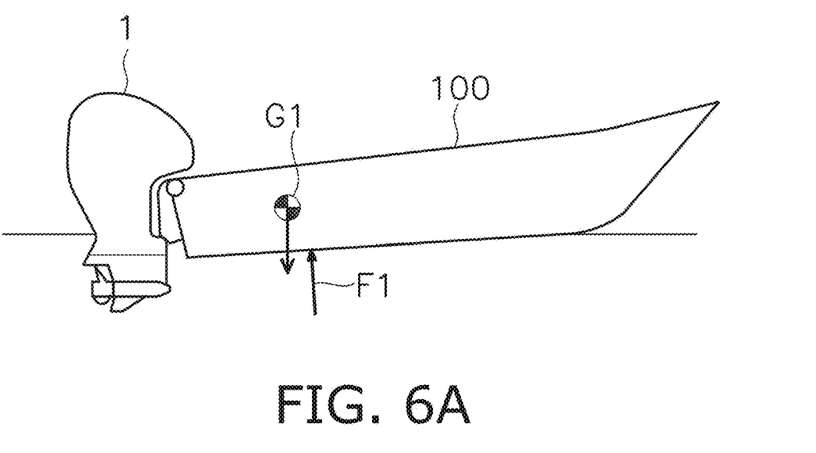
FIG. 6A is a diagram for showing an example of a behavior of the watercraft and a trim motion of the outboard motor during the occurrence of porpoising.
Figure 6B:
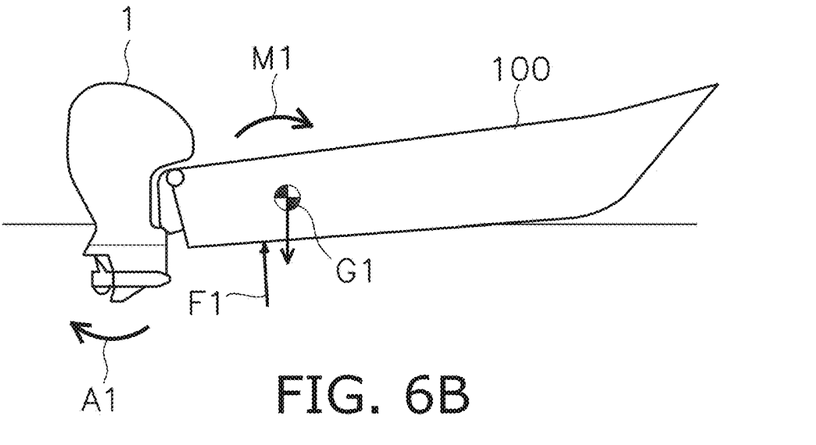
FIG. 6B is a diagram for showing the example of the behavior of the watercraft and the trim motion of the outboard motor during the occurrence of porpoising.
Figure 6C:
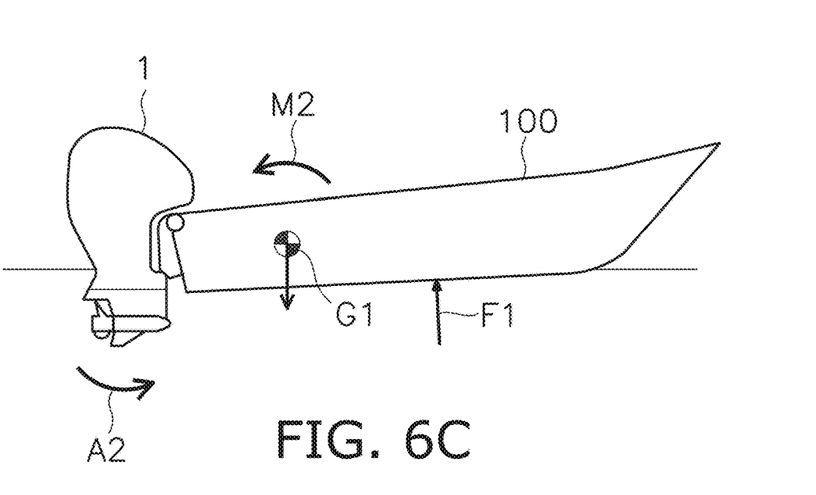
FIG. 6C is a diagram for showing the example of the behavior of the watercraft and the trim motion of the outboard motor during the occurrence of porpoising.

For example, FIGS. 6A to 6C are diagrams for showing an example of the behavior of the watercraft 100 and the trim motion of the outboard motor 1 during the occurrence of porpoising. During the occurrence of porpoising, as shown in FIG. 6A, a lift F1 acts on a position forward of a center-of-gravity G1 of the watercraft 100 such that the bow of the watercraft 100 is elevated. When the bow of the watercraft 100 is elevated as shown in FIG. 6B, the position on which the lift F1 acts is shifted aft of the center-of-gravity G1. Accordingly, a moment M1 acts on the watercraft 100 to lower the bow of the watercraft 100. At this time, during the porpoising inhibiting control, the controller 20 causes the outboard motor 1 to perform the trim motion in the trim-up direction as indicated by arrow A1. Accordingly, a moment, which is generated by the thrust of the outboard motor 1 and directed to elevate the bow of the watercraft 100, is increased in magnitude such that the moment M1 directed to lower the bow of the watercraft 100 is canceled out.

Conversely, when the bow of the watercraft 100 is lowered as shown in FIG. 6C, the position on which the lift F1 acts is shifted forward of the center-of-gravity G1. Accordingly, a moment M2 acts on the watercraft 100 to elevate the bow of the watercraft 100. At this time, during the porpoising inhibiting control, the controller 20 causes the outboard motor 1 to perform the trim motion in the trim-down direction as indicated by arrow A2. Accordingly, a moment, which is generated by the thrust of the outboard motor 1 and directed to elevate the bow of the watercraft 100, is reduced in magnitude such that the moment M2 directed to elevate the bow of the watercraft 100 is canceled out. As described above, the moment M1, M2, directed to lower/elevate the bow of the watercraft 100, is reduced in magnitude by the trim motion of the outboard motor 1. Consequently, the occurrence of porpoising of the watercraft 100 is inhibited.

During the porpoising inhibiting control described above, the trim motion of the outboard motor 1 in the trim-up direction and that in the trim-down direction are equal or substantially equal in duration to each other. However, the trim motion of the outboard motor 1 in the trim-up direction and that in the trim-down direction are different in velocity from each other due to a traveling state of the watercraft 100 such as a thrust. Because of this, even when the trim motion of the outboard motor 1 in the trim-up direction and that in the trim-down direction are performed for an equal duration, it is difficult to keep the trim angle of the outboard motor 1 at a target angle. For example, as shown in FIG. 5, a median of the trim angle is likely to vary to the trim-down directional side.

Figure 7:
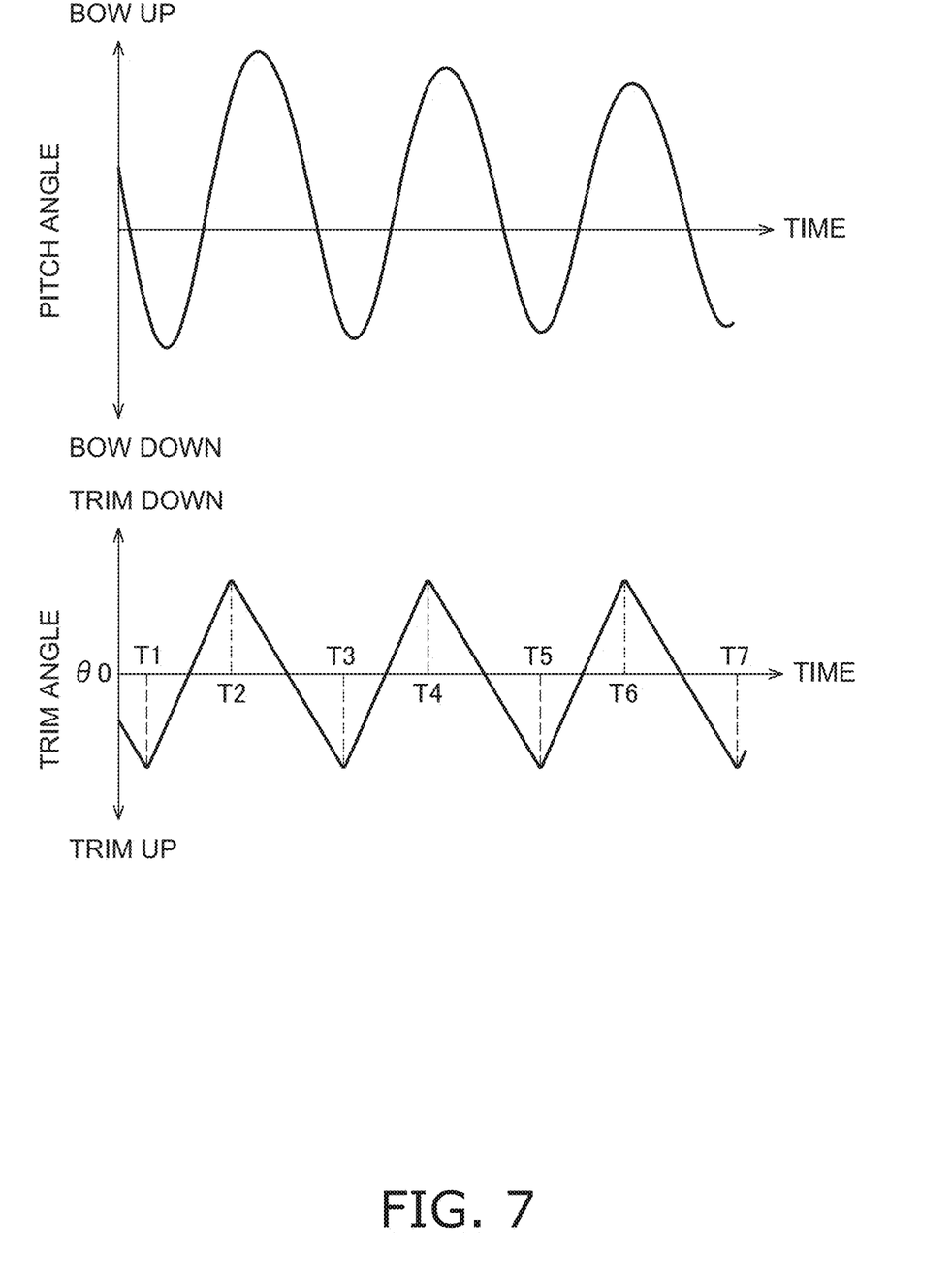
FIG. 7 includes a chart for showing a variation in a pitch angle of the watercraft during the occurrence of porpoising and a chart for showing a variation in a trim angle caused by the porpoising inhibiting control.

In view of the above, when the outboard motor 1 is caused to perform the trim motion in the trim-up direction, the controller 20 sets the duration of the trim motion to be longer than when the outboard motor 1 is caused to perform the trim motion in the trim-down direction. For example, as shown in FIG. 7, the controller 20 sets the duration T2-T3, T4-T5, T6-T7 of the trim motion in the trim-up direction to be longer than the duration T1-T2, T3-T4, T5-T6 of the trim motion in the trim-down direction. Accordingly, the median of the trim angle is kept at a target angle θ0.

Preferred embodiments of the present invention have been explained above. However, the present invention is not limited to the preferred embodiments described above, and a variety of changes can be made without departing from the gist of the present invention.

Instead of the outboard motor 1, another type of propulsion device such as an inboard engine outboard drive or a jet propulsion device may be used. The structure of the outboard motor 1 is not limited to that in the preferred embodiments described above and may be changed. For example, the drive unit 2 is not limited to the internal combustion engine, and alternatively, may be an electric motor. Yet alternatively, the drive unit 2 may be a hybrid system of an internal combustion engine and an electric motor. The outboard motor 1 is not limited in number to one. The outboard motor 1 may be two or more in number.

The periodic parameter is not limited to that in the preferred embodiments described above and may be changed. For example, in the preferred embodiments described above, the periodic parameter includes the pitch angle of the watercraft 100, the pitch angular velocity thereof, and the trim angle of the outboard motor 1. However, the pitch angle of the watercraft 100 may be omitted from the periodic parameter. Alternatively, the pitch angular velocity may be omitted from the periodic parameter. Another variable may be added to the periodic parameter. The magnitude in amplitude of the periodic parameter as an absolute value is not limited to 1 and may be another numeric value.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a behavior of a watercraft, the system comprising:
    an outboard motor including a trim shaft and that is pivotably attachable to the watercraft about the trim shaft;
    an actuator to cause the outboard motor to perform a trim motion in a trim-up direction and a trim-down direction by causing the outboard motor to pivot about the trim shaft;
    a pitch angle sensor to detect at least either of a pitch angle of the watercraft and an angular velocity of the pitch angle;
    a trim angle sensor to detect a trim angle of the outboard motor; and
    a controller communicably connected to the actuator and configured or programmed to:
        obtain the at least either of the pitch angle of the watercraft and the angular velocity of the pitch angle;
        obtain the trim angle of the outboard motor;
        selectively set either the trim-up direction or the trim-down direction as a trim direction based on the trim angle of the outboard motor and at least either of the pitch angle of the watercraft and the angular velocity of the pitch angle; and
        control the actuator to cause the outboard motor to perform the trim motion in the trim direction.

2. The system according to claim 1, wherein the controller is configured or programmed to:
    calculate a parameter based on the trim angle of the outboard motor and at least either of the pitch angle of the watercraft and the angular velocity of the pitch angle, the parameter periodically varying during an occurrence of porpoising of the watercraft; and
    selectively set either the trim-up direction or the trim-down direction as the trim direction based on the parameter.

3. The system according to claim 2, wherein the parameter periodically varies between a first value and a second value; and the controller is configured or programmed to:
    set the trim-up direction as the trim direction when the parameter becomes the first value; and
    set the trim-down direction as the trim direction when the parameter becomes the second value.

4. The system according to claim 1, wherein the controller is configured or programmed to control the actuator to cause the outboard motor to perform the trim motion in the trim direction when it is determined that the pitch angle periodically varies at about 0.1 Hz or greater.

5. A method of controlling a behavior of a watercraft including an outboard motor that is pivotable about a trim shaft, and an actuator to cause the outboard motor to perform a trim motion in a trim-up direction and a trim-down direction by causing the outboard motor to pivot about the trim shaft, the method comprising:
    obtaining at least either of a pitch angle of the watercraft and an angular velocity of the pitch angle;
    obtaining a trim angle of the outboard motor;
    selectively setting either the trim-up direction or the trim-down direction as a trim direction based on the trim angle of the outboard motor and at least either of the pitch angle of the watercraft and the angular velocity of the pitch angle; and
    controlling the actuator to cause the outboard motor to perform the trim motion in the trim direction.

6. The method according to claim 5, further comprising:
    calculating a parameter based on the trim angle of the outboard motor and at least either of the pitch angle of the watercraft and the angular velocity of the pitch angle, the parameter periodically varying during an occurrence of porpoising of the watercraft; and
    selectively setting either the trim-up direction or the trim-down direction as the trim direction based on the parameter.

7. The method according to claim 6, wherein the parameter periodically varies between a first value and a second value, and the method further comprises:
    setting the trim-up direction as the trim direction when the parameter becomes the first value; and
    setting the trim-down direction as the trim direction when the parameter becomes the second value.

8. The method according to claim 5, further comprising:
controlling the actuator to cause the outboard motor to perform the trim motion in the trim direction when the pitch angle periodically varies at about 0.1 Hz or greater.

9. A system for controlling a behavior of a watercraft, the system comprising:
- a marine propulsion device including a trim shaft and that is pivotably attachable to the watercraft about the trim shaft;
- an actuator to cause the marine propulsion device to perform a trim motion in a trim-up direction and a trim-down direction by causing the marine propulsion device to pivot about the trim shaft;
- a pitch angle sensor to detect at least either of a pitch angle of the watercraft and an angular velocity of the pitch angle;
- a trim angle sensor to detect a trim angle of the marine propulsion device; and
- a controller connected to the actuator in a communicable manner and being configured or programmed to:
  - obtain at least either of the pitch angle of the watercraft and the angular velocity of the pitch angle;
  - obtain the trim angle of the marine propulsion device;
  - selectively set either the trim-up direction or the trim-down direction as a trim direction based on the trim angle of the marine propulsion device and at least either of the pitch angle of the watercraft and the angular velocity of the pitch angle; and
  - control the actuator to cause the marine propulsion device to perform the trim motion in the trim direction.

* * * * *